(12) United States Patent
Sachuk (10) Patent No.: US 7,446,972 B2
(45) Date of Patent: Nov. 4, 2008

(54) TAPE DRIVE WITH A SINGLE REEL TAPE CARTRIDGE HAVING SINGLE GUIDE SURFACE AND METHOD FOR DRIVING

(75) Inventor: Daniel B. Sachuk, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 435 days.

(21) Appl. No.: 10/627,371

(22) Filed: Jul. 24, 2003

(65) Prior Publication Data

US 2005/0017113 A1  Jan. 27, 2005

(51) Int. Cl.
G11B 23/04 (2006.01)

(52) U.S. Cl. .................. 360/95; 360/132; 242/346; 242/615.2

(58) Field of Classification Search ............. 360/95, 360/132; 242/346, 346.2, 348, 348.3, 615.2, 242/615.21, 615.3
See application file for complete search history.

(56) References Cited

U.S. PATENT DOCUMENTS

| | | | |
|---|---|---|---|
| 3,990,110 A | 11/1976 | Gunschmann | |
| 4,093,148 A | 6/1978 | Urynowicz et al. | |
| 4,262,860 A * | 4/1981 | Hurtig et al. | 242/343.2 |
| 5,001,511 A | 3/1991 | Katoh et al. | |
| 5,173,828 A | 12/1992 | Tanzer et al. | |
| 5,284,308 A | 2/1994 | Comeaux et al. | |
| 5,377,927 A * | 1/1995 | Erickson et al. | 242/346 |
| 5,414,585 A | 5/1995 | Saliba | |
| 5,513,815 A * | 5/1996 | Erickson et al. | 242/346 |
| 5,543,992 A * | 8/1996 | Hu et al. | 360/132 |
| 5,657,937 A * | 8/1997 | Todd et al. | 242/345.1 |
| 5,703,741 A * | 12/1997 | Wrobel et al. | 360/132 |
| 5,716,018 A * | 2/1998 | Begley et al. | 242/346 |
| 5,754,378 A * | 5/1998 | Ishikawa et al. | 360/132 |
| 5,760,995 A | 6/1998 | Heller et al. | |
| 5,906,324 A | 5/1999 | Adams et al. | |
| 6,078,481 A * | 6/2000 | Vanderheyden et al. | 360/132 |
| 6,095,445 A | 8/2000 | Hentrich | |
| 6,125,096 A | 9/2000 | Jacobs et al. | |
| 6,141,184 A | 10/2000 | Daly | |
| 6,175,470 B1 | 1/2001 | Stamm | |
| 6,205,001 B1 | 3/2001 | Vanderheyden et al. | |

(Continued)

FOREIGN PATENT DOCUMENTS

EP  0 239 291  9/1987
EP  1 288 935  3/2003

*Primary Examiner*—Brian E Miller
(74) *Attorney, Agent, or Firm*—Morrison & Foerster LLP (57) ABSTRACT

A tape drive having a single reel data storage cartridge disposed therein is provided. The single reel data storage cartridge includes a housing having an access window and a reel rotatably disposed within the housing and having storage tape wound on the reel. A guide surface is further disposed within the housing such that the tape extends from the reel to the guide surface before extending to the access window. The tape drive includes at least a first guiding element, a data transducer, and a take-up reel, wherein the storage tape extends from the supply reel to the guide surface before extending through the access window to the first guiding element, and the storage tape is guided within the tape drive adjacent a data transducer, and wound on the take-up reel.

17 Claims, 5 Drawing Sheets

U.S. PATENT DOCUMENTS

| | | |
|---|---|---|
| 6,246,542 B1 | 6/2001 | Hu |
| 6,267,325 B1 | 7/2001 | Rathweg |
| 6,271,991 B1 | 8/2001 | Saliba et al. |
| 6,310,744 B1 | 10/2001 | Kobayashi et al. |
| 6,320,727 B1 | 11/2001 | Cope et al. |
| 6,343,757 B1 | 2/2002 | Zwettler |
| 6,405,957 B1 | 6/2002 | Alexander et al. |
| 6,744,593 B1 | 6/2004 | Nayak et al. |
| 6,915,982 B2 * | 7/2005 | Mewes et al. ............ 242/615.3 |
| 6,969,021 B1 | 11/2005 | Nibarger |
| 2002/0122270 A1 | 9/2002 | Kano et al. |
| 2006/0186244 A1 | 8/2006 | Sachuk |
| 2006/0187575 A1 | 8/2006 | Sachuk |
| 2007/0025012 A1 | 2/2007 | Sachuk |

* cited by examiner

TAPE DRIVE WITH A SINGLE REEL TAPE CARTRIDGE HAVING SINGLE GUIDE SURFACE AND METHOD FOR DRIVING

BACKGROUND OF THE INVENTION

1. Field of the Invention

The invention relates generally to storage devices housing magnetic storage media, and more specifically to single reel cartridges for housing magnetic storage tape and having one or more guide surfaces therein.

2. Description of the Related Art

Digital tape-recording remains a viable solution for the storage of large amounts of data in computer systems. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity and retrieval performance is desired of all commercially viable mass storage devices and media. In the case of linear streaming tape recording, a popular trend is toward multi head, multi-channel fixed or servo (positioning) head structures with narrowed recording gaps and data track widths so that many linear data tracks may be achieved on a tape medium of a predetermined width, such as one-half inch width tape. To increase the storage density for a given cartridge size, the bits on the tape may be written to smaller areas and on a plurality of parallel longitudinal tracks. As more tracks are recorded on the tape, each track becomes increasingly narrow. As the tracks become more narrow, the tape becomes more susceptible to errors caused from the tape shifting up or down (often referred to as lateral tape motion or "LTM") in a direction perpendicular to the tape travel path as the tape passes by the magnetic head. In order to maintain proper alignment of the head with the data tracks on the tape, the tape is generally mechanically constrained to minimize lateral tape motion and data retrieval errors.

Lateral tape motion is generally defined as the peak-to-peak distance of the undesirable movement (in-plane) of the tape perpendicular to its prescribed longitudinal direction of motion past a read/write head. Lateral tape motion and the ability to compensate for and reduce lateral tape motion is a major limiting factor in determining the minimum width of a track and the minimum spacing between tracks on the tape. Thus, as lateral tape motion is reduced, more tracks may be stored on the tape and the storage capacity increases accordingly.

Tape substrates are also being made thinner to increase data storage for a given cartridge size. The thinner tape allows more tape to be contained within the same size diameter reel cartridges, e.g., a cartridge about four inches square and one inch high for use with a five and one quarter inch tape drive. Increasing the tape within a given cartridge increases the data storage capacity of the cartridge. Thinner tapes, however, are generally less rigid making them more susceptible to lateral tape motion errors and damage or wear to the tape from the tape drive assembly. For example, guides and rollers that may be used, at least in part, to reduce lateral tape motion and define a tape path through a tape drive adjacent a read/write head may damage edge portions of the tape.

One approach to minimize lateral tape motion tracking errors is to provide a multi-roller tape guide structure within a tape drive, such as the type described in commonly assigned U.S. Pat. No. 5,414,585, entitled "Rotating Tape Edge Guide," the disclosure thereof being incorporated herein by reference in its entirety. Such an approach may provide a reduction in both lateral tape motion and possible damage to the tape during guiding.

The advent of new head technologies, however, such as magneto-resistive read heads, and new higher coercivity recording media, data track widths have become very small, and many additional data tracks may be defined on the tape. Unfortunately, lateral tape motion remains as a limiting factor, and at certain data track width dimensions and data track densities, it is not possible to follow the tape accurately enough to provide reliable performance during reading and writing operations. Further, as tape thickness is decreased tape edge damage and lateral tape motion become an increasingly greater problem.

Therefore, conventional systems have not been able to keep pace with the increased data storage capacity desired for magnetic tape storage media, including increasingly narrow data tracks and thinner storage media. A need exists therefore for a device and method to reduce lateral tape motion and reduce tape edge damage to potentially allow for increased data storage capabilities.

BRIEF SUMMARY OF THE INVENTION

In one example of one aspect of the invention, a single reel data storage cartridge is provided. The single reel data storage cartridge includes a housing having an access window and a reel with storage tape wound thereon rotatably disposed within the housing. A guide surface is further disposed within the housing wherein the storage tape extends from the reel to the guide surface before extending through the access window, and the storage tape is adapted to be releasably attached to a take-up reel of a tape drive such that the storage tape may be removed from the housing through the access window to pass by a data transducer and wound on the take-up reel. The guide surface thereby increases the tape path from the reel to the access window and subsequent guiding elements within a tape drive to reduce the force imparted on the tape edge during guiding.

According to another example of another aspect of the invention, a tape path between a storage cartridge supply reel and a tape drive take-up reel is provided. The tape path extends from the supply reel housed within the cartridge and is guided within a tape drive adjacent a data transducer before engaging the take-up reel in the tape drive. The tape path is further guided by a guide surface within the storage cartridge housing prior to engaging a first guiding element of the tape drive. The distance of the tape path between the supply reel within the cartridge and the first guiding element of the tape drive is increased by the guide surface.

The present invention is better understood upon consideration of the detailed description below in conjunction with the accompanying drawings and claims.

DETAILED DESCRIPTION OF THE INVENTION

The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

According to one example, a single reel storage cartridge housing magnetic storage tape and having an internal guide surface is described. The storage cartridge includes at least one guide surface within the cartridge housing configured to increase the tape span or path length from the cartridge reel to a first guiding element located within a tape drive. Increasing the tape span length between the cartridge reel and the first guiding element may reduce the force required to guide the tape at the first guiding element. Reducing the guiding force on the edges of the tape at the first guiding element within the tape drive reduces the potential for tape edge damage and lateral tape motion.

The potential for tape edge damage is generally a function of the force applied to the tape edges. In particular, for a given tape thickness and material, the guiding force applied to the tape edges will be proportional to the damage and wear to the tape edges. Further, the guiding force is generally inversely proportional to the path length or tape span length from the cartridge reel to the first guiding element in a tape drive. For example, the guiding force is generally proportional to $1/L^3$, where L is the tape path length from where the tape leaves the cartridge reel and underlying wound tape to the first guiding element within a tape drive. Therefore, the potential for tape edge damage may be reduced by using one or more guide surfaces inside the cartridge reel to increase the path length, i.e., L, before the tape extends from the cartridge housing and engages a guiding element of a tape drive.

Figure 1:
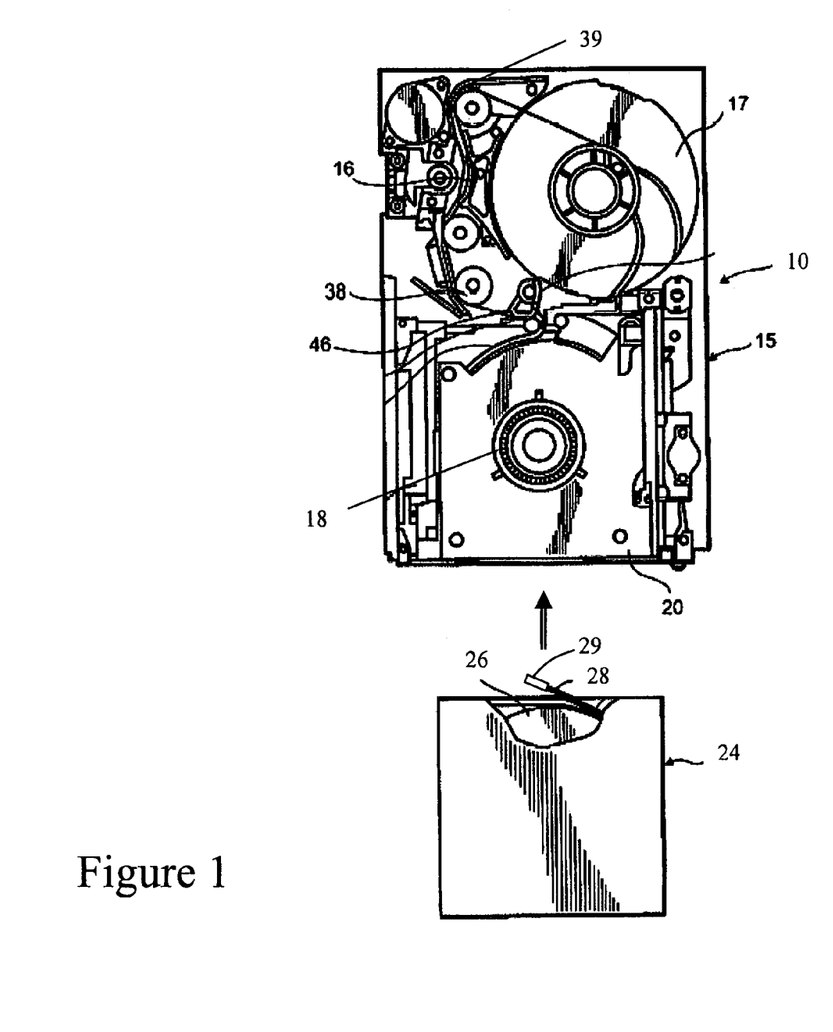
FIG. 1 illustrates a plan view of an exemplary magnetic tape drive and magnetic tape cartridge.

Referring initially to FIG. 1, an exemplary tape drive 10 is illustrated that may be used with an exemplary cartridge 24 having one or more internal guide surfaces to increase the tape path and reduce the potential for tape edge damage. Tape drive 10 includes a tape drive housing 15, a data transducer, i.e., read and/or write head 16, a take-up reel 17, and a receiver 20. Tape drive 10 is used in conjunction with a cartridge 24 which houses a storage tape 28 on supply reel 26. Receiver slot 20 is configured to receive a suitable cartridge 24 therein adjacent reel driver 18. Tape drive 10 may also include a door and various mechanisms for receiving and ejecting cartridge 24. When cartridge 24 is received in receiver slot 20 a buckler motor 46 or the like may engage a cartridge leader and stream storage tape 28 along a tape path within tape drive 10 passing read/write head 16 and onto take-up reel 17. The tape path may include various tape guides 39, rollers 38, one or more read/write heads 16, and the like before being wound upon take-up reel 17.

Tape drive 10 is typically installed within or associated with a computer (not shown) or computer network. Additionally, tape drive 10 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety.

Cartridge 24 generally includes a substantially rectangular cartridge housing which encloses cartridge reel 26 and storage tape 28. Cartridge 24 may further include a cartridge door to protect storage tape 28 therein and a cartridge leader (not separately shown) having a leader block 29 adapted to be releasably attached to the take-up reel 17, which is exposed when the door is open. Storage tape 28 stores information in a form, e.g., digital, that may be subsequently retrieved if desired. Storage tape 28 may be approximately one-half inch in width, but larger and smaller widths are contemplated, e.g., 4-8 mm. Storage tape 28 may have a thickness of approximately 0.5 mils (0.0005 inch) or thinner. Typically, storage tape 28 includes a storage surface on one side of storage tape 28 that may be divided into a plurality of parallel tracks along the length of storage tape 28. Alternatively, the data may be recorded in diagonal strips across storage tape 28.

It should be understood that the exemplary cartridges having an internal guide surface described herein may be used with various tape drives not explicitly shown or described. Additionally, various other features of a tape drive may be included, for example, various buckler systems, rollers, tape guides, receiving mechanisms, dampers, and the like may be used. A detailed description of various components of a tape drive system that may be used is provided in U.S. Pat. No. 6,095,445, entitled "CARTRIDGE BUCKLER FOR A TAPE DRIVE," which is incorporated herein by reference in its entirety. A representative magnetic tape drive for which an exemplary storage cartridge may be used is sold by Quantum Corporation under the trademark SDLT™ 320.

Figure 2:
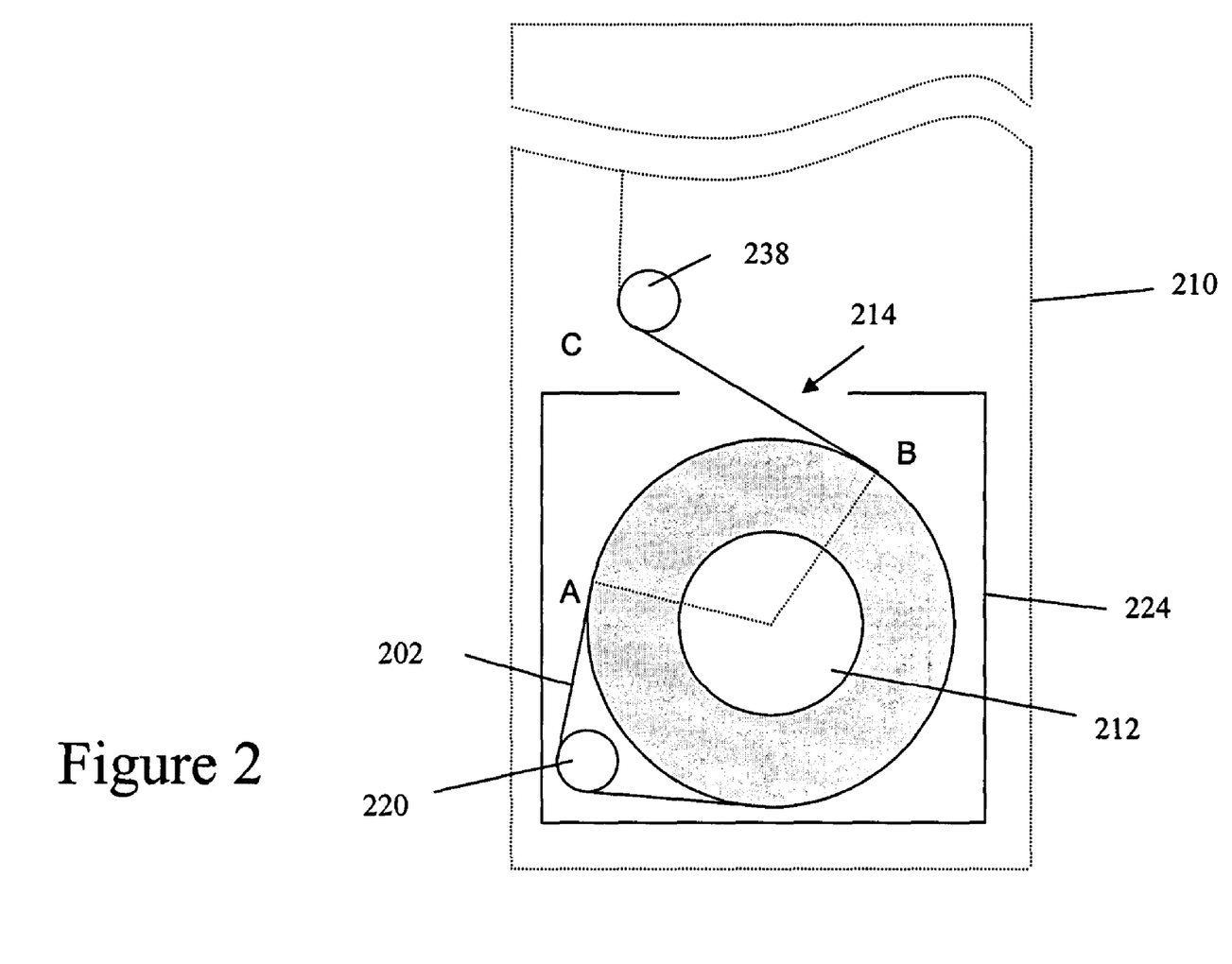
FIG. 2 illustrates a cross-sectional view of an exemplary cartridge having an internal guide surface.

With reference now to FIG. 2, a schematic cross-sectional view of an exemplary cartridge 224 having an internal guide surface 220 is shown within a tape drive 210 having a first guiding element 238. Cartridge 224 further includes cartridge reel 212 having storage tape 202 wound thereon, and extending to guide surface 220 and access window 214.

Generally, storage tape 202 is wrapped between two flanges of reel 212 that are separated by a distance slightly greater than the width of storage tape 202. For a variety of reasons, storage tape 202 may be offset and have a force imparted to the tape edge at the first guiding element 238 located within tape drive 210. For example, as storage tape 202 is wound onto reel 212 storage tape 202 may not stack evenly on reel 212 such that as storage tape 202 unwinds storage tape 202 is offset from the first guiding element 238. Further, reel 212 itself may be offset from first guiding element 238. If the guiding force is too great at the first guiding element 238 the force may cause damage to the edges of storage tape 202. Damages to the edges of storage tape 202 may increase the propensity for undesirable lateral tape motion during operation.

In this example, guide surface 220 is positioned such that storage tape 202 is lifted from the tape wound on reel 212 at point A as reel 212 rotates counterclockwise. Tape 202 reengages reel 212 and underlying tape wound thereon after engaging guide surface 220 in the lower right hand side of reel 212 of FIG. 2 before disengaging again at point B. During operation, tape 202 may "float" on a thin layer of air trapped between tape 202 and underlying wound tape as the tape reengages with reel 212 between the guide surface 220 and point B of reel 212. The thin layer of air reduces the friction between tape 202 and underlying wound tape and allows tape 202 to be guided by guiding element 238 over the distance from point A to point C.

A tape span or path length for which tape 202 may be guided includes the distance from where storage tape 202 initially leaves reel 212 at point A to where storage tape 202 engages the first guiding element 238 of tape drive 210. The tape path extends generally from point A, where the tape 202 is lifted from reel 212, around guide surface 220 and reel 212 to point B, where tape 202 extends through access window 214 to guiding element 238 at point C. The addition of guide surface 220 guiding storage tape 202 away from reel 212 at point A increases the path length from B to C to further include the distance from point A, around guide surface 220, and to point B. For example, if cartridge 224 does not include guide surface 220, the tape path between reel 212 and guiding element 238 would extend generally from point B to point C. The addition of guide surface 220 increases the tape path by more than one-half of the circumference of reel 212.

The force acting on the edge of storage tape 202 is inversely proportional to the path length between reel 212 and first guiding element 238. Therefore, the increased tape span or tape path distance by including the internal guide surface 220 may reduce the force and damage to the edge of tape 202 when guiding tape 202 to a desired path within the tape drive 210 for reading and/or writing.

Guide surface 220 is shown in this example as a cylindrical element. Guide surface 220, however, may include a variety of different shaped devices and contoured surfaces. For example, it is contemplated that guide surface 220 may include a stationary pin or rod, roller, contoured surface, and the like. Further, the diameter and position of guide surface 220 may vary within cartridge housing 210 depending on the particular application, desired dimensions of cartridge 224, and desired tape path length between guide surface 220 and access window 214.

Cartridge housing 224 is preferably sized to be received by a typical tape drive, such as for use within a 5.25 inch (130 mm) form factor drive, a 3.5 inch (90 mm) form factor drive, or other useful size. An access window 214 is included on one side to allow access to storage tape 202. Access window 214 may be covered by a door (not shown) that may be selectively opened when accessing storage tape 202.

Cartridge 224 may include various shapes and designs such as square, rectangular, circular, and the like. Cartridge 224 may further include various formed indentations, protrusions, notches, and the like for utility or aesthetics. In one example, cartridge 224 includes two sections, for example, a base section and a cover section, which mate together to house storage tape 202. It will be recognized by those skilled in the art that numerous configurations and designs for the cartridge housing are possible.

The cartridge housing may be made of any suitable material, for example plastic and the like. The cartridge housing preferably includes a rigid material to protect the enclosed reel and magnetic tape. Further, the cartridge housing may be manufactured by injection molding processes as are known in the art. The internal guide surface(s) may be comolded with the housing or disposed in any suitable manner. Further, the guide surfaces may include any suitable material such as plastics, low friction metals, ceramics, and the like.

Figure 3:
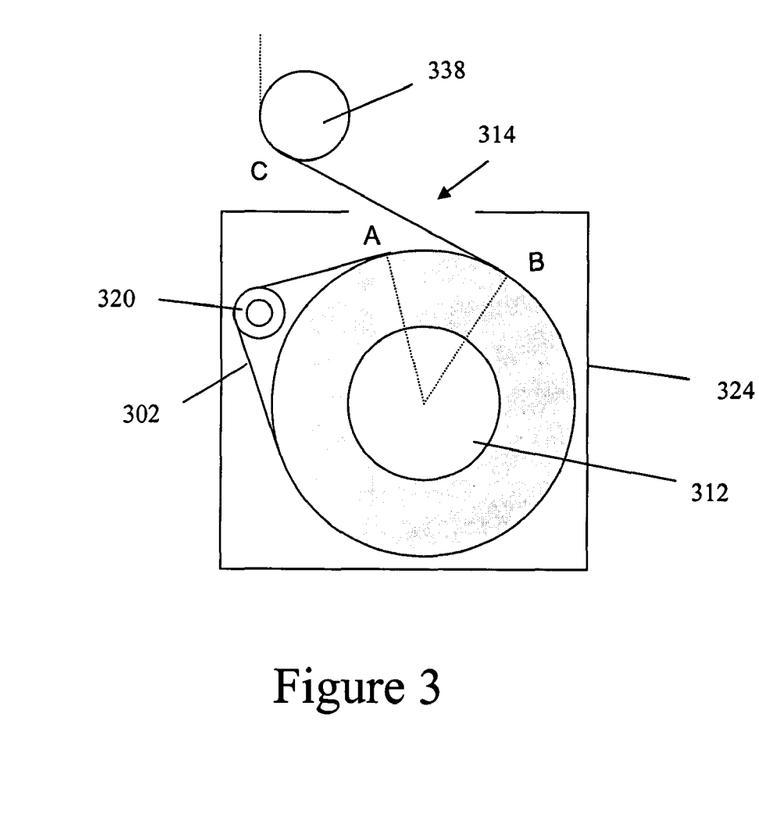
FIGS. 3-6 illustrate cross-sectional views of various exemplary cartridges having one or more internal guide surfaces.

FIGS. 3-7 illustrate various cross-sectional views of exemplary cartridges having one or more internal guide surfaces. In particular, FIG. 3 illustrates an exemplary cartridge 324 with a single guide surface 320 disposed within cartridge 324 to increase the tape path within cartridge 324 and to first guiding element 338. In this example, the guide surface 320 is positioned closer to access window 314 to increase the tape path by greater than three-fourths of the circumference of reel 312, i.e., from point A around guide surface 320 and underlying wound tape on reel 312 to point B.

Guide surface 320 includes a roller in this example that is rotatably mounted within the housing of cartridge 324. This allows guide surface 320 to rotate as tape 302 passes by, which may reduce the frictional force and potential wear and damage to tape 302 during rotation of reel 312. Alternatively, a stationary guide surface might be desired to frictionally dampen lateral tape motion as tape 302 is unwound from reel 312.

Figure 4:
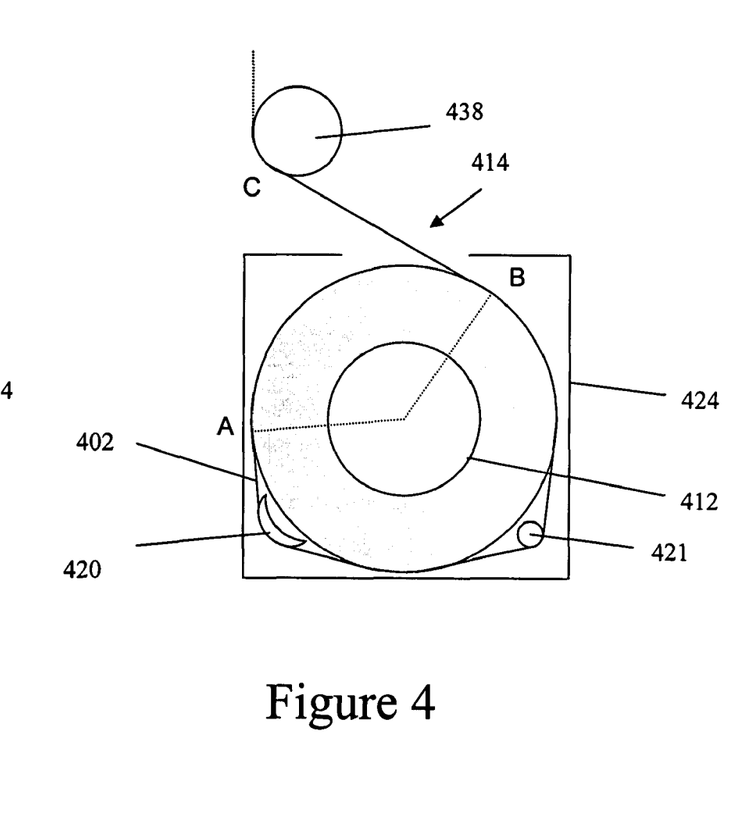

FIG. 4 illustrates another exemplary cartridge 424. In this example, cartridge 424 includes two internal guide surfaces. A first guide surface 420 may be included to lift tape 402 from reel 412 at point A. Guide surface 420 includes a contoured surface configured to reduce the wrap angle created between tape 402 and the leading/trailing edges of guide surface 420. Reducing the wrap angle may reduce potential damage and wear to tape 402 as tape 402 passes guide surface 420. The lower profile guide surface 420 may further allow for a smaller cartridge 424 housing because it may be disposed in close proximity to reel 412.

Further, cartridge 424 includes a second guide surface 421 positioned to guide and increase the path length of tape 402. Guide surface 421 may include a fixed pin, rotating surface, or contoured surface depending on the particular application. It should be recognized that cartridge 424 may include either guide surface 420 or 421 alone or in combination with various other guide surfaces. Additionally, at slower streaming speeds, tape 402 may not float sufficiently when reengaging reel 412 after first guide surface 420, e.g., the air may squeeze out from tape 402 and underlying tape on reel 412 before reaching point B. Lifting tape 402 a second time reduces the time and distance that tape 402 reengages reel 412 to reduce the friction when reengaging reel 412.

Figure 5:
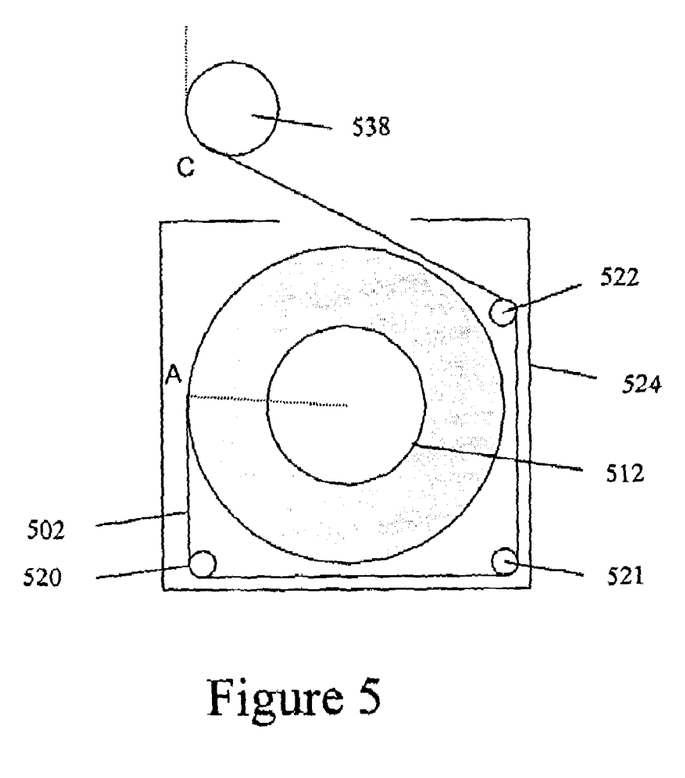

FIG. 5 illustrates another exemplary cartridge 524 having three guide surfaces 520, 521, and 522 within the housing of cartridge 524. Guide surfaces 520, 521, and 522 are configured within the housing of cartridge 524 such that the tape path is increased from point A to point C, but tape 502 does not reengage tape reel 512 before engaging first guiding element 538. Guide surfaces 520, 521, and 522 may include any type or shape of guide surface, and fewer or more guide surfaces may be used depending on the application, for example, only guide surface 522 might be used. Cartridge 524 may be used in applications where tape 502 reengaging reel 512 is undesirable.

Figure 6:
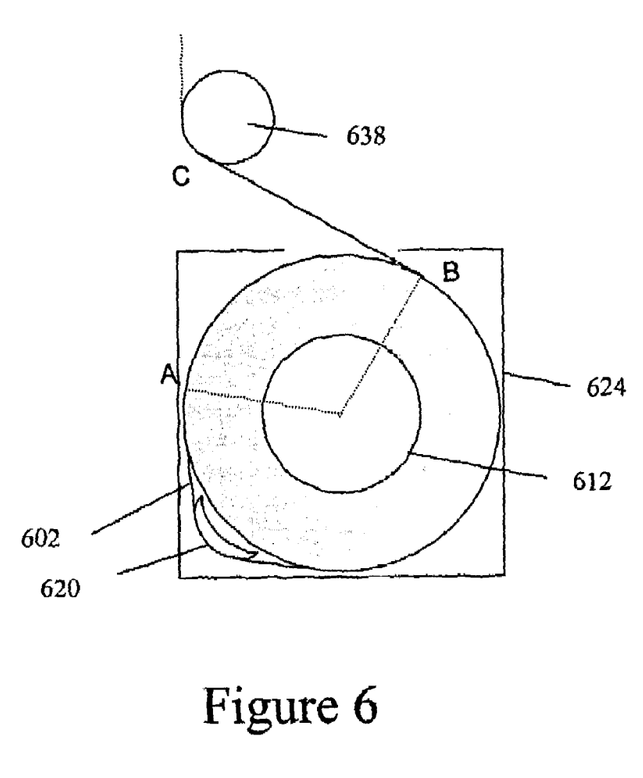

FIG. 6 illustrates another exemplary cartridge 624 having a single guide surface 620 within the housing. This example illustrates an internal guide surface 620 having a compact design and low wrap angle of tape 602 with the guide surface 620. As shown, guide surface 620 may fit within the corner of the cartridge 624 housing adjacent reel 612. In this instance, the rectangular housing does not need to be enlarged to accommodate guide surface 620. Further, guide surface 620 is shaped to reduce the wrap angle of tape 602 both as tape 602 approaches and exits guide surface 620, i.e., when tape 602 is wound and unwound from reel 612. It should be recognized of course that a cylindrical pin or roller shaped guide surface 620 may also be disposed in a corner of the housing of cartridge 624 and maintaining similar dimensions of cartridge 624.

Figure 7A:
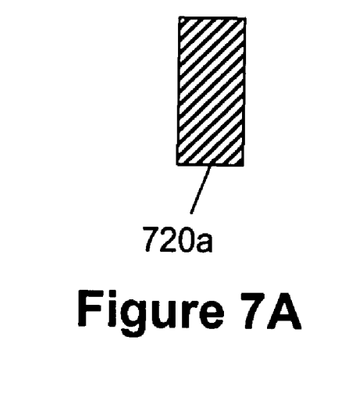
FIGS. 7A-7C illustrate cross-sectional views of exemplary guide surfaces.
Figure 7B:
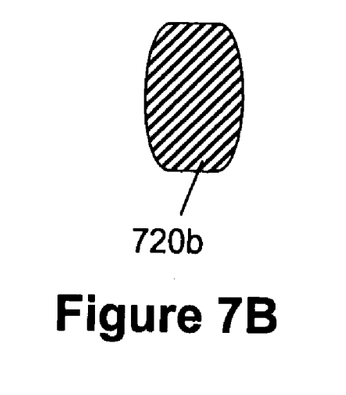
Figure 7C:
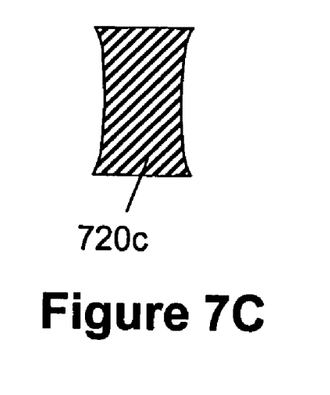
Figure 8A:
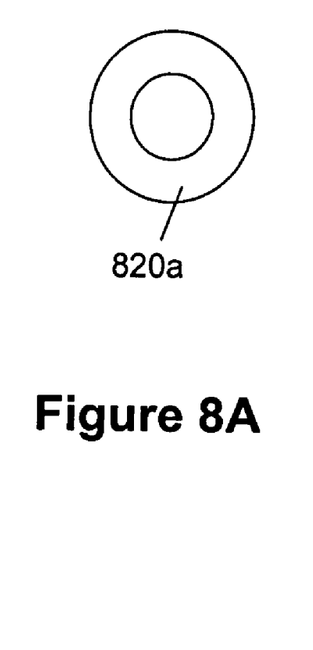
FIGS. 8A-8D illustrate top views of exemplary guide surfaces.
Figure 8B:
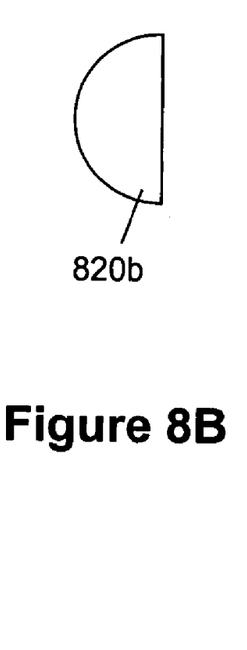
Figure 8C:
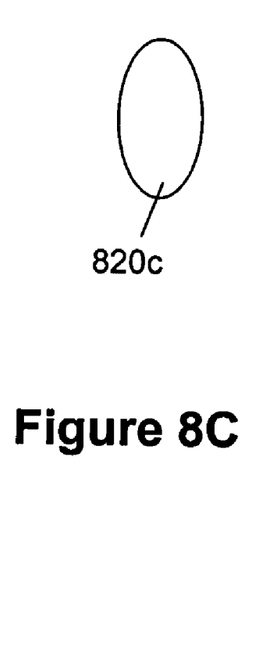
Figure 8D:
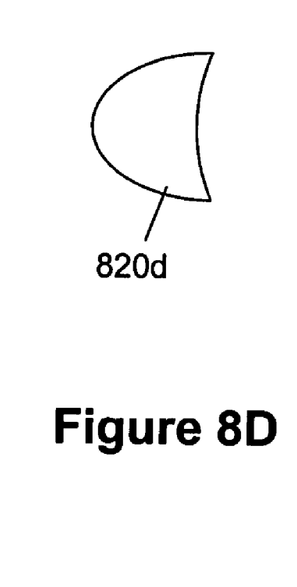

FIGS. 7A-7C illustrate various side cross-sectional views of exemplary cylindrical shaped guide surfaces 720*a-c*. The exemplary cylindrical guide surfaces 720*a-c* may include stationary elements or rotating elements. Further, the exemplary guide surfaces 720*a-c* may include any surface of revolution such as concave or convex guide surfaces as shown in FIGS. 7B and 7C to assist in guiding the storage tape and/or reducing potential damage to the storage tape during operation.

FIGS. 8A-8D illustrate various top views of exemplary guide surfaces 820*a-d*. As illustrated the guide surfaces may include a variety of shapes and designs to create desired guide surfaces, wrap angles, and the like. The various guide surfaces 820*a-d* may be used alone or in any combination depending on the particular application. The various guide surfaces may also be oriented in different configurations, include a compound radius surface, and the like to create different wrap angles with the storage tape.

The above detailed description is provided to illustrate exemplary embodiments and is not intended to be limiting. It will be apparent to those skilled in the art that numerous modification and variations within the scope of the present invention are possible. Accordingly, the present invention is defined by the appended claims and should not be limited by the description herein.

The invention claimed is:

1. A tape drive with a storage cartridge disposed therein, comprising:
   a storage cartridge housing having:
      a single supply reel rotatably disposed within the storage cartridge housing and having storage tape wound on the supply reel,
      only a single access window for allowing a tape drive access to the storage tape wound on the supply reel for reading or writing to the storage tape, and
      only a single guide surface disposed within the storage cartridge housing, wherein the guide surface is positioned within the storage cartridge housing to guide the storage tape away from the supply reel and then back to reengage tape of the supply reel before extending to the access window; and
   a tape drive having:
      at least a first guiding element,
      a data transducer, and
      a take-up reel, wherein
   the storage tape is guided within the tape drive along a tape path passing adjacent a data transducer, and wound on the take-up reel, wherein the storage tape passes adjacent the data transducer along the tape path between at least the first guiding element and the take-up reel.

2. The device of claim 1, wherein the guide surface includes a rotatable surface.

3. The device of claim 1, wherein the guide surface includes a stationary surface.

4. The device of claim 1, wherein the guide surface includes a contoured surface.

5. The device of claim 1, wherein the data transducer includes at least one of a read head and a write head.

6. The device of claim 1, wherein the storage tape includes a leader block adapted to be releasably attached to the take-up reel.

7. A method for driving a data storage tape cartridge, comprising the acts of:
   receiving a data storage cartridge within a tape drive, wherein the storage cartridge includes a housing with a supply reel rotatably disposed therein and only a single guide surface; and
   linearly streaming a storage tape along a tape path from the supply reel of the storage cartridge, adjacent a data transducer located in the tape drive, and to a take-up reel of the tape drive, wherein
   the data transducer is located along the tape path between a first guiding element of the tape drive and the take-up reel of the tape drive, and
   the guide surface is positioned within the housing to guide the storage tape away from supply reel and back to reengage tape of the supply reel before extending to an access window of the housing.

8. The method of claim 7, wherein the guide surface includes a rotatable surface.

9. The method of claim 7, wherein the guide surface includes a stationary surface.

10. The method of claim 7, wherein the guide surface includes a contoured surface.

11. The method of claim 7, wherein when streaming the storage tape, the storage tape becomes separated from the reel by a thin layer of air.

12. The method of claim 7, further including a second guide surface disposed within the housing, wherein the storage tape extends to a second guide surface before extending to the access window.

13. A tape drive with a storage cartridge disposed therein, comprising:
   a storage cartridge housing having:
      an access window,
      a supply reel rotatably disposed within the storage cartridge housing and having storage tape wound on the supply reel, and
      only a single guide surface disposed within the storage cartridge housing, wherein the guide surface is positioned within the storage cartridge housing to guide the storage tape away from the supply reel and then back to reengage tape of the supply reel before extending to the access window; and
   a tape drive having:
      at least a first guiding element,
      a data transducer, and
      a take-up reel, wherein
   the storage tape is guided within the tape drive along a tape path passing adjacent a data transducer, and wound on the take-up reel, wherein the storage tape passes adjacent the data transducer along the tape path between at least the first guiding element and the take-up reel.

14. The device of claim 13, wherein the access window of the cartridge housing is the only access window for allowing the tape drive access to the storage tape wound on the supply reel for reading or writing to the storage tape.

15. The device of claim 13, wherein the guide surface includes a rotatable surface.

16. The device of claim 13, wherein the guide surface includes a stationary surface.

17. The device of claim 13, wherein the guide surface includes a contoured surface.

* * * * *